H. L. BRALY.
VALVE FOR WATER TANKS.
APPLICATION FILED MAY 12, 1910.
1,038,836.
Patented Sept. 17, 1912.
2 SHEETS—SHEET 1.
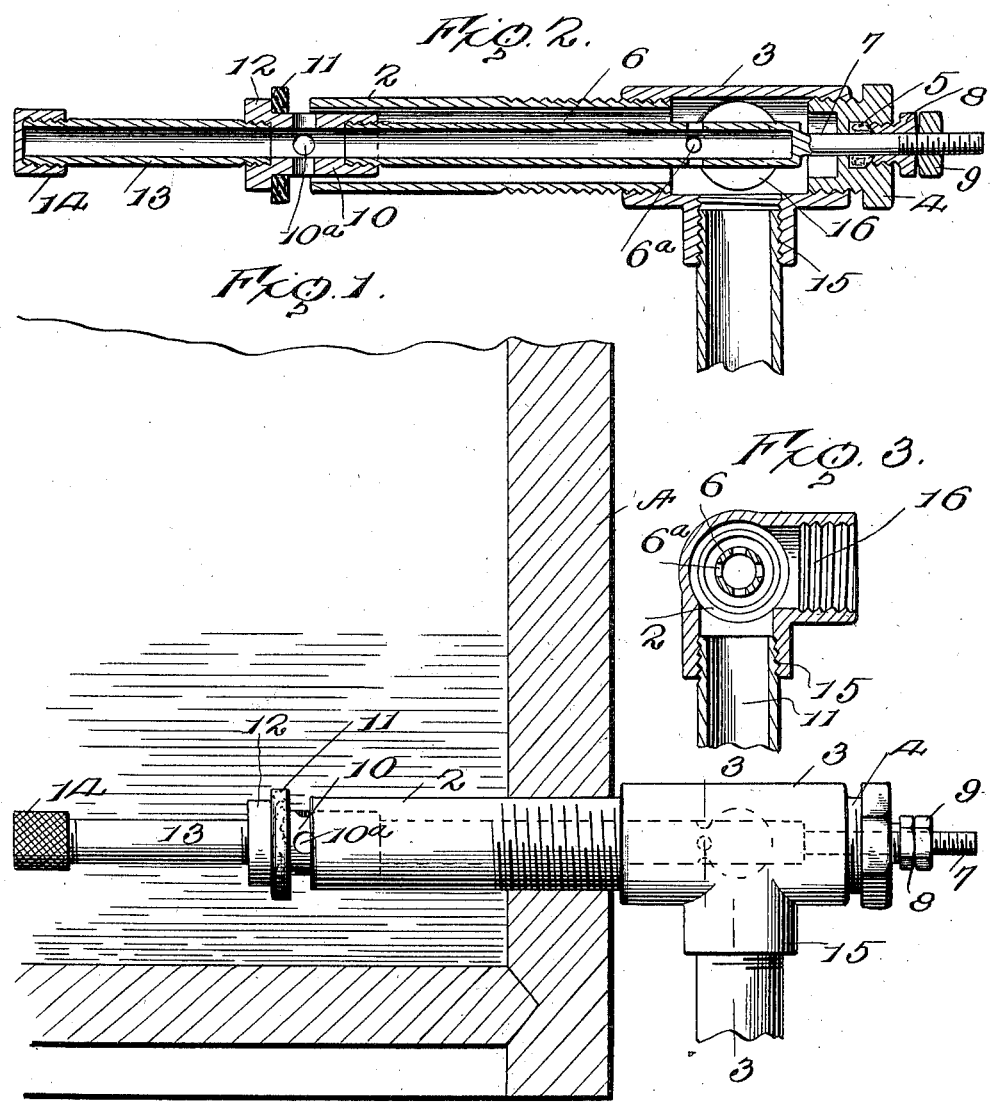

H. L. BRALY.
VALVE FOR WATER TANKS.
APPLICATION FILED MAY 12, 1910.
1,038,836.
Patented Sept. 17, 1912.
2 SHEETS—SHEET 2.
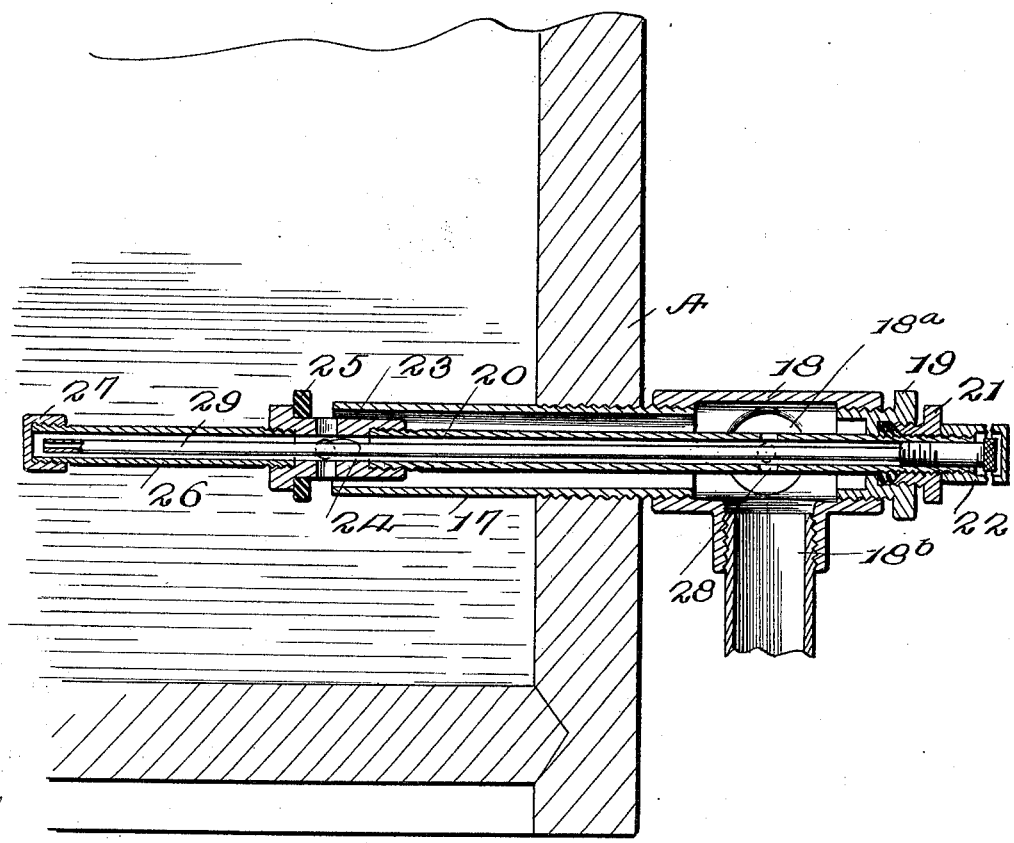

UNITED STATES PATENT OFFICE.

HUGH L. BRALY, OF SHAMROCK, TEXAS.

VALVE FOR WATER-TANKS.

1,038,836.  Specification of Letters Patent.  Patented Sept. 17, 1912.

Application filed May 12, 1910.  Serial No. 560,997.

*To all whom it may concern:*

Be it known that I, HUGH L. BRALY, a citizen of the United States, residing at Shamrock, in the county of Wheeler and State of Texas, have invented certain new and useful Improvements in Valves for Water-Tanks, of which the following is a specification.

My invention relates to discharge valves for tanks containing water or other liquids, and the primary object of my invention is to provide means whereby air may be introduced into the water below the top thereof so that the water may be drawn from the tank even when the water in the tank is entirely frozen over. Where ice has formed upon the surface of the water so as to prevent the introduction of air it is sometimes very difficult to draw-off the water from the lower portion of the tank, and my invention is designed to obviate this difficulty.

Furthermore, my invention contemplates a device by which air may be introduced into the interior of the tank, so that the pressure of air as it escapes into the tank will act to force the water out through the valve thus increasing the flow of water, especially if the water is to be conveyed through a considerable distance by means of pipes.

While I have shown my invention as applied to the side of a tank, it is to be understood that it will operate in precisely the same manner if applied to the bottom of a tank.

In its essence my invention comprises a draw-off pipe which is carried in the wall of the tank and which is provided with a water outlet opening and an air inlet opening at its outer end. The inner extremity of the pipe is closed by a valve which valve is attached by means of a second pipe extending through the interior of the draw-off pipe to a rod projecting out of the exterior end of the draw-off pipe. This second pipe is provided with perforations and is operated by said rod. By this means air entering the main pipe will be carried back into the tank and water will be discharged from the tank in to the draw-off pipe and through the discharge opening thereof.

For full understanding of the invention reference is to be had to the following description and accompanying drawing, in which:—

Figure 1 is a fragmentary sectional view of a tank showing my improved valve applied thereto. Fig. 2 is longitudinal section of the valve. Fig. 3 is a transverse section on the line 3—3 of Fig. 1. Fig. 4 is a sectional view of a tank showing a modified form of my valve applied thereto, and Fig. 5 is a detail sectional view of the forward end of the compressed air conducting tube and valve.

Corresponding and like parts are referred to in the following description and indicated in all the views of the accompanying drawings by the same reference characters.

Referring to Figs. 1 to 3 which show one form of my invention A designates a tank of any usual or approved form, and 2 the discharge pipe which is inserted through the wall of the tank. This pipe 2 at its outer extremity is screw-threaded for engagement with a three-way coupling 3 of any usual form. The outer extremity of this coupling is screw-threaded for engagement with a bushing 4 having a central perforation, this bushing preferably having a central recess 5 in its outer face. The inner end of the pipe 2 is open. Extending through the center of the pipe 2 and coupling 3 is the longitudinally extending tubular rod 6 which at one end is reduced to form a shank 7 which projects out through a gland 8 in the cap or bushing 4, and which is screw threaded at its extremity to engage with a lock-nut 9. The other extremity of the pipe 6 is screw threaded into a hollow coupling 10 which supports a washer 11 forming a valve. This valve washer 11 bears against a shoulder 12 formed on the extremity of the coupling 10. A pipe 13 of the same bore as the pipe 6 is screw threaded into the end of the coupling 12 and is closed at its extremity by a cap 14. The T coupling or union 3 is formed with two openings, one the water outlet opening 15 and the other the air inlet opening 16, these openings being disposed in angular relation to each other. The pipe 6 is perforated at its outer end as at $6^a$, and the coupling 10 is also perforated as at $10^a$. Thus the interior of the pipe 6 is in communication with the space between the pipe 6 and the outer pipe 2 and the coupling 3. Air which passes in through the air inlet opening 16 is carried rearward and discharged into the tank at the rear end of the discharge pipe 2 and thus, when the valve is open, discharged at the rear of the water which passes through the pipe. It will be seen that by this means when the valve 11 is moved away from the end of the discharge pipe 2, that air is admitted which is discharged into the water in the tank, thus compensating for the water which is withdrawn from the tank without the necessity of breaking the ice which may close the upper portion of the tank. Under normal circumstances the tubular rod 6 is drawn outward by means of a nut 9 so that the valve washer 11 is held firmly against the end of the discharge pipe 2. When it is desired to draw water from the discharge pipe, the nut 9 is turned to force the tubular rod 6 inward, thus disengaging the washer 11 from the end of the discharge pipe 2 and permitting the entrance of water.

In Figs. 4 and 5 I show another form of my invention which operates practically on the same principle as that previously described, although permitting the attachment of a pipe leading from an air compressing means, whereby the water may be more forcibly ejected than was possible with the other construction. In this figure, 17 designates the discharge pipe which at its forward end is connected to a three-way union 18, such as previously described. This union at its forward end is closed by the bushing 19 and the gland 21. The other extremity of the pipe 17 is open, as above described. Centrally mounted in the pipe 17 and the union 18 is the tubular valve rod 20 which at its forward end projects through the bushing 19 and is screw threaded for engagement with a cap 22. Disposed upon the screw threaded end of the valve rod 20 is a nut 22ª whereby the tubular rod may be held in its adjusted position. The tubular rod 20 is provided with a hollow coupling 23 at its rear end having the perforations 24 of the same construction as the coupling 10, previously described. Mounted on the coupling is the valve washer 25 which is normally held against the open end of the pipe 17 and thus closes the pipe when the valve is in its normal position. The coupling 23 is engaged with a section of pipe 26 which is closed by a cap 27. The tubular rod 20 is provided with perforations 28 at its forward end approximately in register with the air inlet opening 18ª in the union 18. By this means air will be drawn in at the forward end of the main pipe and the air will be carried rearward and discharged into the tank in the same manner as previously described. Passing through the tubular valve rod 20 and carried thereby is a small air tube 29 which terminates at its inner end short of the cap 27 and is open at its inner end. The outer extremity of the tube 29 projects out through the open end of the tubular rod 20 and is enlarged to accommodate a valve 30, whereby the extremity of the small tube or pipe 29 may be connected with the nozzle of an air-compressing apparatus, not shown. The valve illustrated for this purpose is so well known that it does not seem necessary to describe it in detail. The operation of this form of my invention is practically the same as that previously described, except that the central small pipe 29 provides means whereby compressed air may be forced into the interior of the tank when the valve 25 is open. It will be seen that by thus forcing compressed air out through the discharge openings 24 that the column of water contained within the pipe 17 will be discharged with considerable force, and thus may be conveyed for relatively long distances by this air pressure.

Having thus described the invention what is claimed as new is:—

1. In a device of the character described, the combination with a tank, of a discharge pipe extending through the wall of said tank and having a liquid inlet opening at its inner end, the outer end of the pipe being provided with separated air inlet and water outlet openings, a tubular rod passing through the pipe and longitudinally movable therein, a valve carried on said rod and adapted to close against the inner end of the pipe, the rod being formed with perforations at its outer and inner ends, and the extremity of the rod being screw-threaded and passing through the end of the discharge pipe, and a nut engaging the screw-threaded end of the rod whereby the valve may be held closed against the end of the discharge pipe.

2. In a device of the character described, the combination with a tank, of a discharge pipe extending through the wall of said tank and having a liquid inlet opening at its inner end, the outer end of the pipe being provided with separate air inlet and water outlet openings, a tubular rod passing through the pipe and longitudinally movable therein, a valve carried on the rod adapted to close against the inner end of the pipe, the rod being formed with a perforation at its outer end and perforations at its inner end disposed adjacent to the face of the valve, and adjusting means engaging the outer end of the rod whereby the rod may move longitudinally and the valve held closed against the end of the pipe.

3. In a device of the character described, the combination with a tank, of a discharge pipe extending through the wall of the tank, the inner end of said pipe having an inlet opening and the outer end being formed with a discharge opening and with an air inlet opening, a tubular rod passing longitudinally through said pipe and formed with a perforation at its inner end, a valve carried on said rod adjacent to said perforation and adapted to close the inlet opening of the pipe when the rod is drawn in one direction and to open said inlet when the rod is forced in the other direction, and an air inlet pipe disposed within the tubular rod having an air inlet opening at its outer end and at its inner end opening into the interior of the tubular rod.

4. In a device of the character described, the combination with a tank, of a discharge pipe extending through the wall of said tank and having a liquid inlet opening at its inner end, the outer end of the pipe being provided with separate air inlet and outlet openings, and a tubular rod passing through the center of the pipe and longitudinally movable therein, a valve carried on said rod adapted to close against the inner end of the pipe, the rod being formed with a perforation at its outer end and a perforation at its inner end adjacent to the face of the valve, means for longitudinally moving the rod to open and close the valve, and an air inlet tube disposed within the rod having a normally closed air inlet opening at its outer end, the inner end of the tube opening into the interior of the rod.

5. In a device of the character described, the combination with a tank, of a discharge pipe extending through the wall of said tank and having a water inlet opening at its inner end, the outer end of the pipe being provided with separate air inlet and water outlet openings, a tubular rod passing through the pipe and longitudinally movable therein, a valve carried on the rod and adapted to close against the inner end of the pipe, the rod being formed with perforations disposed adjacent to the face of the valve, means for longitudinally shifting the rod to open and close the valve, an air inlet pipe disposed within the tubular rod open at its inner end and at its outer end, and detachable means for closing the outer end of the air inlet pipe.

6. In a device of the character described, the combination with a tank, of a discharge pipe extending through the wall of said tank and having a liquid inlet opening at its inner end, said pipe near its outer end being provided with separate air inlet and water outlet openings, a tubular rod passing through the pipe and longitudinally movable therein, said rod passing out through the outer end of the pipe, and a valve carried on the rod adapted to close against the inner end of the pipe, said rod being formed with perforations near its outer end and perforations at its inner end disposed adjacent to the face of the valve.

In testimony whereof I affix my signature in presence of two witnesses.

HUGH L. BRALY. [L. S.]

Witnesses:
 BOB. STEVENSON,
 W. S. CHRISTIAN.

---

Copies of this patent may be obtained for five cents each, by addressing the "Commissioner of Patents, Washington, D. C."